US008298672B2

(12) United States Patent
Wu et al.

(10) Patent No.: US 8,298,672 B2
(45) Date of Patent: Oct. 30, 2012

(54) INTERMEDIATE TRANSFER MEMBERS CONTAINING A SALINE LAYER AND A LAYER OF GLYCOLURIL RESIN AND ACRYLIC RESIN

(75) Inventors: Jin Wu, Pittsford, NY (US); Jonathan H Herko, Walworth, NY (US); Brian P Gilmartin, Williamsville, NY (US); David J Gervasi, Pittsford, NY (US); Dante M Pietrantoni, Rochester, NY (US); Michael S Roetker, Webster, NY (US); Scott J Griffin, Fairport, NY (US); David W Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 434 days.

(21) Appl. No.: 12/608,713

(22) Filed: Oct. 29, 2009

(65) Prior Publication Data

US 2011/0104479 A1 May 5, 2011

(51) Int. Cl.
*G03G 15/16* (2006.01)
*B32B 27/28* (2006.01)
*B32B 27/30* (2006.01)
*B32B 27/34* (2006.01)
*B32B 27/36* (2006.01)

(52) U.S. Cl. ..................... 428/412; 428/195.1; 428/421; 428/422; 428/447; 428/448; 428/451; 428/473.5; 428/474.4; 428/480; 399/308

(58) Field of Classification Search .................. 399/308; 428/195.1, 411.1, 412, 421, 422, 447, 448, 428/451, 473.5, 474.4, 480
See application file for complete search history.

(56) References Cited

U.S. PATENT DOCUMENTS

| | | | | |
|---|---|---|---|---|
| 5,487,707 | A | 1/1996 | Sharf et al. | |
| 6,318,223 | B1 | 11/2001 | Yu et al. | |
| 6,440,515 | B1 | 8/2002 | Thornton et al. | |
| 6,602,156 | B2 | 8/2003 | Schlueter, Jr. | |
| 7,031,647 | B2 | 4/2006 | Mishra et al. | |
| 7,130,569 | B2 | 10/2006 | Goodman et al. | |
| 7,139,519 | B2 | 11/2006 | Darcy, III et al. | |
| 2003/0143363 | A1* | 7/2003 | Yuan et al. | 428/58 |
| 2007/0031650 | A1* | 2/2007 | Kobayashi et al. | 428/323 |
| 2007/0049677 | A1* | 3/2007 | Wu et al. | 524/430 |
| 2007/0147910 | A1* | 6/2007 | Kamei et al. | 399/307 |
| 2008/0003513 | A1* | 1/2008 | Yanus et al. | 430/58.05 |
| 2008/0008950 | A1* | 1/2008 | Wu et al. | 430/58.8 |
| 2008/0032216 | A1* | 2/2008 | Levy et al. | 430/58.8 |
| 2008/0102391 | A1* | 5/2008 | Yanagawa et al. | 430/69 |
| 2008/0107985 | A1* | 5/2008 | Yanus et al. | 430/58.75 |
| 2009/0050255 | A1 | 2/2009 | Herko et al. | |

OTHER PUBLICATIONS

Jin Wu et al., U.S. Appl. No. (Not yet assigned) entitled UV Cured Intermediate Transfer Members, filed Oct. 29, 2009.
Jin Wu et al., U.S. Appl. No. (Not yet assigned) entitled Polymeric Intermediate Transfer Members, filed Oct. 29, 2009.
Jin Wu, U.S. Appl. No. (Not yet assigned) entitled Phosphate Ester Polymeric Mixture Containing Intermediate Transfer Components, filed Oct. 29, 2009.
Jin Wu et al., U.S. Appl. No. 12/550,486 entitled Glycoluril Resin and Acrylic Resin, filed Aug. 31, 2009.
Jin Wu et al., U.S. Appl. No. 12/550,492 entitled Glycoluril Resin and Acrylic Resin Dual Members, filed Aug. 31, 2009.
Jin Wu, U.S. Appl. No. 12/413,645 entitled Layered Intermediate Transfer Members, filed Mar. 30, 2009.
Jin Wu et al., U.S. Appl. No. 12/413,783 entitled Glycoluril Resin and Polyol Resin Members, filed Mar. 30, 2009.
Jin Wu et al., U.S. Appl. No. 12/413,795 entitled Glycoluril Resin and Polyol Resin Dual Members, filed Mar. 30, 2009.
Jin Wu et al., U.S. Appl. No. 12/200,147 entitled Coated Seamed Transfer Member, filed Aug. 28, 2008.
Jin Wu et al., U.S. Appl. No. 12/200,179 entitled Coated Transfer Member, filed Aug. 28, 2008.
Jin Wu, U.S. Appl. No. 12/129,995 entitled Polyimide Intermediate Transfer Components, filed May 30, 2008.
Jin Wu, U.S. Appl. No. 12/181,354 entitled Core Shell Intermediate Transfer Components, filed Jul. 29, 2008.
Jin Wu, U.S. Appl. No. 12/181,409 entitled Treated Carbon Black Intermediate Transfer Components, filed Jul. 29, 2008.
Jin Wu, U.S. Appl. No. 12/129,948 entitled Aminosilane and Self Crosslinking Acrylic Resin Hole Blocking Layer Photoconductors, filed May 30, 2008.
Jin Wu et al., U.S. Appl. No. 12/164,338 entitled Phenolic Resin Hole Blocking Layer Photoconductors, filed Jun. 30, 2008.

* cited by examiner

*Primary Examiner* — Callie Shosho
*Assistant Examiner* — John Freeman
(74) *Attorney, Agent, or Firm* — Eugene O. Palazzo

(57) ABSTRACT

An intermediate transfer member, such as a belt, that includes, for example, a supporting substrate, a silane first intermediate layer, and contained on the silane layer a second layer of a self crosslinking acrylic resin; a mixture of a glycoluril resin and an acrylic polyol resin; or a mixture of a glycoluril resin and a self crosslinking acrylic resin.

28 Claims, No Drawings

INTERMEDIATE TRANSFER MEMBERS CONTAINING A SALINE LAYER AND A LAYER OF GLYCOLURIL RESIN AND ACRYLIC RESIN

CROSS REFERENCE TO RELATED APPLICATIONS

U.S. application Ser. No. 12/608,401, U.S. Publication No. 20110104467, filed Oct. 29, 2009, entitled UV Cured Intermediate Transfer Members, illustrates an intermediate transfer member comprised of a supporting substrate, and a mixture comprised of a conductive component, an epoxy acrylate, and a photoinitiator.

U.S. application Ser. No. 12/608,432, U.S. Publication No. 20110104499, filed Oct. 29, 2009, entitled Polymeric Intermediate Transfer Members, illustrates an intermediate transfer member comprised of a copolymer of a polyester, a polycarbonate, and a polyalkylene glycol.

U.S. application Ser. No. 12/608,683, U.S. Publication No. 20110105658, filed Oct. 29, 2009, entitled Phosphate Ester Polymeric Mixture Containing Intermediate Transfer Members, illustrates an intermediate transfer member comprised of a phosphate ester, and a polymeric binder.

U.S. application Ser. No. 12/550,486, now U.S. Pat. No. 8,084,112, filed Aug. 31, 2009, on Glycoluril Resin And Acrylic Resin Members, the disclosure of which is totally incorporated herein by reference, illustrates an intermediate transfer member comprised of at least one seamed substrate, and wherein the seam is coated with a crosslinked mixture of a glycoluril resin and an acrylic resin U.S. application Ser. No. 12/550,492, now U.S. Pat. No. 8,097,320, filed Aug. 31, 2009, on Glycoluril Resin and Acrylic Resin Dual Members, the disclosure of which is totally incorporated herein by reference, illustrates a process which comprises providing a flexible belt having at least one welded seam extending from one parallel edge to the other parallel edge of the belt, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and an acrylic resin.

U.S. application Ser. No. 12/413,645, now U.S. Pat. No. 7,910,183, filed Mar. 30, 2009, entitled Layered Intermediate Transfer Members, the disclosure of which is totally incorporated herein by reference, illustrates an intermediate transfer member comprised of a polyimide substrate, and thereover a polyetherimide/polysiloxane.

Illustrated in U.S. application Ser. No. 12/413,783, now U.S. Pat. No. 8,084,110, filed Mar. 30, 2009, Glycoluril Resin and Polyol Resin Members, the disclosure of which is totally incorporated herein by reference, is an intermediate transfer member comprised of a seamed substrate, and wherein the seam is coated with a mixture of a glycoluril resin and a polyol resin.

U.S. application Ser. No. 12/413,795, now U.S. Pat. No. 8,105,670, filed Mar. 30, 2009, entitled Glycoluril Resin And Polyol Resin Dual Members, the disclosure of which is totally incorporated herein by reference, illustrates a process which comprises providing a flexible belt having at least one welded seam extending from one parallel edge to the other parallel edge of the coating, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and a polyol resin or polymer.

Illustrated in U.S. application Ser. No. 12/200,147, U.S. Publication No. 20100055328, filed Aug. 28, 2008, entitled Coated Seamed Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179, now U.S. Pat. No. 8,068,776, filed Aug. 28, 2008, entitled Coated Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 11/895,255, filed Aug. 22, 2007, U.S. Publication No. 20090050255, is a process for the post treatment of an ultrasonically welded seamed flexible imaging member belt comprising providing a flexible belt having a welded seam extending from one parallel edge to the other parallel edge, the welded seam having a rough seam region comprising an overlap of two opposite edges; positioning the flexible belt on a lower anvil such that the flexible belt is held in position on the lower anvil by vacuum; contacting the rough seam region with a heat and pressure applying tool; and smoothing out the rough seam region with heat and pressure applied by the heat and pressure applying tool to produce a flexible belt having a smooth welded seam without removing the seam material.

BACKGROUND

Disclosed are intermediate transfer members, and more specifically, coated seamed intermediate transfer members useful in transferring a developed image in an electrostatographic, for example xerographic, including digital, image on image, and the like, printers, machines or apparatuses. In embodiments, there are selected, for example, seamed intermediate transfer members comprised of a conductive material like carbon black, a polyaniline, or mixtures thereof dispersed in a polymer solution, such as a polyamic acid solution to form a polyimide supporting substrate as illustrated in applications U.S. application Ser. No. 12/129,995, U.S. application Ser. No. 12/181,354, and U.S. application Ser. No. 12/181,409, the disclosures of which are totally incorporated herein by reference; and thereafter, applying to the aforementioned polyimide containing substrate a layer of a silane, such as an aminosilane, and which layer functions primarily as a primer layer that adheres the top layer to the silane layer and the supporting polyimide substrate layer of the member, and where the top layer is, for example, comprised of a crosslinked acrylic resin, a mixture of an aminoplast resin and an acrylic polyol resin, which mixture is crosslinked upon heating and where a catalyst can be selected to assist in the crosslinking; and a crosslinked mixture of a glycoluril resin and a self crosslinking acrylic resin. The intermediate transfer members disclosed herein in embodiments include a supporting substrate, such as a polyimide, which can be seamed or weldable (thermoplastic polyimide) or seamless (thermoset polyimide), and also the members may include a reverse double welded seam, where the seam is formed by ultrasonic welding on one side followed by ultrasonic welding on the opposite side.

Intermediate transfer belts can be generated in the form of seamed belts fabricated by fastening two ends of a web material together, such as by welding, sewing, wiring, stapling, or gluing. While seamless intermediate transfer belts are known, they may require manufacturing processes that render them more costly as compared to similar seamed intermediate transfer belts.

Seamed belts can be fabricated from a sheet cut that originates from an imaging member web. The sheets are generally rectangular, or in the shape of a parallelogram where the seam does not form a right angle to the parallel sides of the sheet. All edges may be of the same length, or one pair of parallel edges may be longer than the other pair of parallel edges. The sheets are formed into a belt by joining overlapping opposite marginal end regions of the sheet. A seam is typically produced in the overlapping marginal end regions at the point of joining. Joining of the aforementioned areas may be effected by any suitable means, such as by welding like ultrasonic welding, gluing, taping, pressure heat fusing, and the like.

Ultrasonic welding can be accomplished by retaining in a down position the overlapped ends of a flexible imaging member sheet with a vacuum against a flat anvil surface, and guiding the flat end of an ultrasonic vibrating horn transversely across the width of the sheet, over and along the length of the overlapped ends to form a welded seam. Ultrasonically welding results in an overlap seam that has an irregular surface topology rendering it difficult for a cleaning blade to remove toner around the seam, and such welding can also cause damage to the cleaning blades by nicking the cleaning edge of the blade. In addition, toner trapping resulting from the poor cleaning and the blade damage causes streaking from the seam and creates an image quality problem. Many post fabrication seam smoothing techniques, which remove material from the seam, may also degrade seam strength.

Also, when ultrasonically welded into a belt, the seam of a multilayered electrophotographic flexible imaging member may occasionally contain undesirable high protrusions such as peaks, ridges, spikes, and mounds. These seam protrusions present problems during image cycling of the belt because they interact with the cleaning blade causing blade wear and tear, which can affect cleaning blade efficiency and reduce service life.

In a typical electrostatographic reproducing apparatus, a light image of an original to be duplicated is recorded in the form of an electrostatic latent image upon a photosensitive member or photoconductor, and the latent image is subsequently rendered visible by the application of electroscopic thermoplastic resin particles and colorant. Generally, the electrostatic latent image is contacted with a developer mixture comprised of carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a substrate like paper. It is advantageous to transfer the developed image to a coated intermediate transfer web, belt or component, and subsequently transfer with very high transfer efficiency the developed image from the intermediate transfer member to a permanent substrate. The toner image is subsequently usually fixed or fused upon a support, which may be the photoconductor or other support such as plain paper.

In electrostatographic printing machines, wherein the toner image is electrostatically transferred by a potential difference between the imaging member and the intermediate transfer member, the transfer of the toner particles to the intermediate transfer member, and the retention thereof should be substantially complete so that the image ultimately transferred to the image receiving substrate will have a high resolution. It is desired that substantially about 100 percent toner transfer occurs when most or all of the toner particles comprising the image are transferred, and little residual toner remains on the surface from which the image was transferred.

Intermediate transfer members in a xerographic environment allow for a number of advantages such as enabling high throughput at modest process speeds, registration of the final color toner image in color systems using synchronous development of one or more component colors using one or more transfer stations, and permitting a variety of final substrates that can be used. However, a bump, surface irregularity, or other discontinuity in the seam of the member, such as a belt, may disturb the tuck of the cleaning blade as it makes intimate contact with the photoconductive member surface to effect residual toner and debris removal. The increased height differential may allow toner to pass under the cleaning blade, and not be cleaned. Furthermore, seams having differential heights may, when subjected to repeated striking by cleaning blades, cause photoconductive member cycling speed disturbance which adversely affects the crucial photoconductive belt motion quality. Moreover, seams with a bump or any morphological defects can cause the untransferred residual toner to be trapped in the sites of the seam surface irregularities. The seam of a photoreceptor belt, which is repeatedly subjected to the striking action by a cleaning blade under machine functioning conditions, can trigger the development of premature seam delamination failure. In addition, the discontinuity in belt thickness due to the presence of an excessive seam height yields variances of mechanical strength in the belt, and reduces the fatigue flex life of the seam when cycling over belt module support rollers. As a result, both the cleaning life of the blade, and the overall service life of the photoreceptor belt can be diminished.

Moreover, the protrusion high spots in the intermediate member seam may also interfere with the operation of the xerographic subsystems by damaging electrode wires used in development, which wires parallel to and closely spaced from the outer imaging surface of a belt photoreceptor. These closely spaced wires are employed to facilitate the formation of a toner powder cloud at a development zone adjacent to a toner donor roll, and the imaging surface of the belt imaging member.

In operation, an intermediate transfer belt is contacted with a toner image bearing member such as a photoreceptor belt. In the contact zone, an electrostatic field generating device, such as a corotron, a bias transfer roller, a bias blade, or the like, creates electrostatic fields that transfer toner onto the intermediate transfer belt. Subsequently, the intermediate transfer belt is brought into contact with a receiver. An electrostatic field generating device then transfers toner from the intermediate transfer belt to the receiver. Depending on the system, a receiver can be another intermediate transfer member, or a substrate like paper onto which the toner will eventually be fixed.

Thus, there is a need for a seamed member, such as a belt, that avoids or eliminates a number of the disadvantages mentioned herein, and more specifically, there is a need for an intermediate transfer belt (ITB) where adhesion of the layers to each other are excellent, for example there is substantially no peeling of the layers. There also continues to be a need for an intermediate transfer member, such as a belt (ITB) with a coated seam or double welded seam surface topology such that it can withstand dynamic fatigue conditions; where the seam or seams are of minimum visibility and possess excellent surface resistivities; where, in embodiments, a reverse double welded seam can be achieved without additional finishing steps, such as sanding; and where the coating layer is mechanically robust and electrically matches the surface resistivity of the seamed ITB, and adheres strongly to the ITB base layer. For example, the coated seam as disclosed herein provides a smooth surface with substantially decreased or eliminated profile protrusions or irregularities thereby extending its service life. There is also a need for a substantially completely imageable seam, which avoids or minimizes the disadvantages indicated herein by overcoating the seam with a conducting polymer mixture layer, and which layer is mechanically robust and electrically matches the surface resistivity of the seamed intermediate transfer belt (ITB), or intermediate transfer member, which resistivity is, for example, from about $10^9$ to about $10^{13}$ ohm/sq, and more specifically about $10^{10}$ ohm/sq.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and very costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

According to embodiments illustrated herein, there is provided a flexible intermediate transfer member, such as a belt (ITB), that has an excellent surface topology of its welded overlap seam while maintaining seam strength, and processes for the preparation of flexible belts.

In embodiments, there is disclosed a process for the treatment, especially post treatment of an ultrasonically welded seamed flexible imaging member belt comprising providing a flexible belt having at least one, such as one or two welded seams extending from one parallel edge to the other parallel edge of the belt, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure being applied by the heat and pressure applying tool to produce a flexible belt having a smooth welded seam without substantially removing any seam material; and then subsequently coating the seam with the adhesive primer layer illustrated herein, and depositing on the primer layer a crosslinked resin mixture of a glycoluril resin and a crosslinked acrylic resin; and an intermediate transfer member, that is seamless, or with seams as disclosed herein, such as intermediate transfer belts, comprised of a seamed substrate, and wherein the seam is coated with, for example, resin mixture of a glycoluril resin and a self crosslinking acrylic resin.

Embodiments illustrated herein also provide a process for the post treatment of an ultrasonically welded seamed flexible imaging member belt comprising providing a flexible belt comprised of a supporting substrate, a welded seam extending from one parallel edge to the other parallel edge of the belt, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool, the heat and pressure applying tool being selected from the group consisting of an ultrasonic vibrating horn, an automated heated pressure roller, and a heated upper anvil; smoothing out the rough seam region with heat and pressure to produce a flexible belt having a smooth welded seam; and thereafter overcoating the seam with a primer layer, and thereover coating the primer layer with the various resin mixtures illustrated herein; and a process which comprises providing a flexible belt having a polyimide supporting substrate, a welded seam extending from one parallel edge to the other parallel edge, the welded seam having a rough seam region comprising an overlap of two opposite edges of the substrate, positioning the flexible belt on a lower anvil such that the flexible belt is held in position on the lower anvil by a vacuum, contacting the rough seam region with a heat and pressure applying tool, and smoothing out the rough seam region with heat and pressure applied by the heat and pressure applying tool to produce a flexible belt having a smooth welded seam, and subsequently coating the entire seam or the entire member with a primer layer, which layer functions primarily as an adhesive, and then applying to the primer a layer comprised of the various resin or the resin mixtures illustrated herein.

Embodiments illustrated herein also provide an intermediate transfer member and processes thereof for the post treatment of an ultrasonically reverse double welded seamed flexible imaging member belt comprising providing a flexible belt having a welded seam extending from one parallel edge to the other parallel edge of the member, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool, the heat and pressure applying tool being selected from the group consisting of an ultrasonic vibrating horn, an automated heated pressure roller, and a heated upper anvil; smoothing out the rough seam region with heat and pressure to produce a flexible belt having a smooth welded seam; and repeating the welding process on the opposite side of the welded flexible belt; and thereafter overcoating in sequence the substrate, that is seamless or with at least one seam, such as 1 to 4 seams, with an adhesive layer and one of resins or the resin mixtures illustrated herein; and a process which comprises providing a flexible belt photoconductor having a welded seam extending from one parallel edge to the other parallel edge of the belt, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure applied by the heat and pressure applying tool to produce a flexible belt having a smooth welded seam; and repeating the welding process on the opposite side of the seamed flexible belt; and subsequently coating the entire seam, or seams, or the entire belt with an adhesive layer by applying a silane adhesive layer to the supporting substrate followed by providing on the adhesive layer various resins and resin mixtures as illustrated herein.

DETAILED DESCRIPTION

Aspects of the present disclosure relate to an intermediate transfer member comprised of a supporting substrate, a silane first intermediate layer, and contained on the silane layer a second layer of a crosslinked acrylic resin, which resin can be crosslinked by, for example, heating; a mixture of a glycoluril resin and an acrylic polyol resin; or a mixture of a glycoluril resin and a self crosslinking acrylic resin; an intermediate transfer member (ITM) comprised, in sequence, of a polyimide supporting substrate, a first intermediate adhesive silane layer, and contained on the silane layer a second layer selected from the group consisting of a self crosslinking acrylic resin, a crosslinked mixture of a glycoluril resin and an acrylic polyol resin, and a crosslinked mixture of a glycoluril resin and a self crosslinking acrylic resin, wherein the crosslinking value is from about 50 to about 100 percent; an ITM where the crosslinked acrylic resin possesses a weight average molecular weight ($M_w$) of from about 120,000 to about 200,000, a polydispersity index (PDI) ($M_w/M_n$) of from about 2 to about 3, and a surface resistivity of from about $10^9$ to about $10^{12}$ ohm/sq, the glycoluril resin is represented by the formula

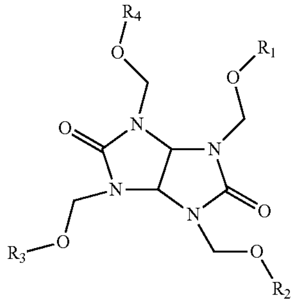

and wherein the glycoluril resin optionally possesses a number average molecular weight of from about 200 to about 1,000, and a weight average molecular weight of from about 230 to about 3,000, and each R group is alkyl with, for example, from about 1 to about 6 carbon atoms, the silane is an aminosilane selected from 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, N-2-aminoethyl-3-aminopropyl tris (ethylethoxy)silane, p-aminophenyl trimethoxysilane, N,N'-dimethyl-3-aminopropyl triethoxysilane, 3-aminopropylmethyl diethoxysilane, 3-aminopropyl trimethoxysilane, N-methylaminopropyl triethoxysilane, methyl[2-(3-trimethoxysilylpropylamino)ethylamino]-3-propionate, (N,N'-dimethyl 3-amino)propyl triethoxysilane, N,N-dimethylaminophenyl triethoxysilane, or trimethoxysilyl propyldiethylene triamine, wherein the thickness of the supporting substrate is from about 50 to about 400 microns, the thickness of the silane layer is from about 0.01 to about 5 microns, and the thickness of the second layer is from about 5 to about 150 microns, and wherein the polyimide substrate has at least one seam or is seamless; and further wherein the supporting substrate, the silane layer, and the second layer contain a conductive component of carbon black, a polyaniline, a metal oxide, or mixtures thereof, each present in an amount of from 1 to about 50 weight percent; an intermediate transfer belt comprised, in sequence, of a polyimide supporting substrate, an adhesive silane layer, and a second layer selected from the group consisting of a crosslinked acrylic resin; a crosslinked mixture of a glycoluril resin and an acrylic polyol resin; and a crosslinked mixture of a glycoluril resin and a crosslinked acrylic resin, wherein the crosslinking is accomplished in the presence of an acid catalyst, and the crosslinking value is, for example, from about 50 to about 100, or from about 60 to about 85 percent; and the crosslinked acrylic resin possesses a weight average molecular weight ($M_w$) of from about 120,000 to about 200,000, a polydispersity index (PDI) ($M_w/M_n$) of from about 2 to about 3, and a surface resistivity of from about $10^9$ to about $10^{12}$ ohm/sq, the glycoluril resin is represented by the formula

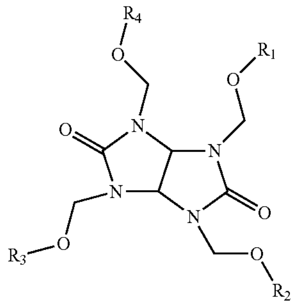

and wherein the glycoluril resin optionally possesses a number average molecular weight of from about 200 to about 1,000, and a weight average molecular weight of from about 230 to about 3,000, and each R group is alkyl with from about 1 to about 4 carbon atoms; and the silane is an aminosilane selected from 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, or N-2-aminoethyl-3-aminopropyl tris(ethylethoxy)silane, wherein the thickness of the supporting substrate is from about 50 to about 250 microns, the thickness of the silane layer is from about 0.05 to about 1 micron, and the thickness of the second layer is from about 10 to about 100 microns, and wherein the polyimide substrate has at least one seam; and further wherein the polyimide supporting substrate, the silane layer, and the second layer optionally contain a conductive component of carbon black, a polyaniline, or a metal oxide, each present in an amount of from 1 to about 25 weight percent, and wherein the acrylic polyol resin possesses a number average molecular weight of from about 400 to about 50,000, and a weight average molecular weight of from about 500 to about 100,000; a process which comprises providing a flexible belt having at least one welded seam extending from one parallel edge to the other parallel edge of a polyimide supporting substrate, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a silane followed by coating the seam and the silane with a layer of a self crosslinking acrylic resin, a mixture of a glycoluril resin and an acrylic polyol resin, or a mixture of a glycoluril resin and a self crosslinking acrylic resin; a process which comprises providing a flexible belt having at least one welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seamed belt with a silane primer layer, and which primer layer is then coated with a layer comprised of a resin or resin mixture as illustrated herein, such as a crosslinked acrylic resin, or a resin mixture of a glycoluril resin and an acrylic resin; an intermediate transfer member comprised of a polyimide substrate with at least one seam, and wherein the substrate, the at least one seam or both are coated with a primer layer and then a coating of a crosslinked mixture of a glycoluril resin and an acrylic resin; an intermediate transfer belt comprised of a supporting substrate with from about 1 to about 4 seams, and wherein the belt and the seams when present contain a primer layer, and which primer layer is coated with the resins and mixture of resins like a mixture of a glycoluril resin and a self crosslinking acrylic resin; an intermediate transfer member comprised of at least one seamed substrate, including a reverse double welded seam, and wherein the seamed or double welded seamed substrate is coated with a primer layer, followed by depositing on the primer layer a top layer comprised of an acrylic resin, or a mixture of resins illustrated herein; a process which comprises providing a flexible belt having a welded seam extending from one parallel edge to the other parallel edge of the belt, the welded seam having a rough seam region comprising an overlap of two opposite edges, contacting the rough seam region with a heat and pressure applying tool; and smoothing out the rough seam region with heat and pressure applied by the heat and pressure applying tool to produce a flexible belt having a smooth welded seam, and subsequently coating the seamed belt with a primer layer and an acrylic resin layer, such as a mixture of a glycoluril resin and a self crosslinking acrylic resin; a process which comprises providing a flexible belt having two welded seams extending from one parallel edge to the other parallel edge of the belt, the welded seam having a rough seam region comprising an overlap of two opposite edges, positioning the flexible belt on the lower portion of an anvil or similar device such that the flexible belt is held in position on the lower anvil by a vacuum, contacting the rough seam region with heat and pressure, smoothing out the rough seam region with heat and pressure applied by a known heat and pressure applying device to produce a flexible belt having a smooth welded seam, and subsequently coating the seamed belt with a primer component, and where the primer layer is coated with an acrylic resin layer; an intermediate transfer member comprised of a seamed substrate, and wherein the seamed belt is fully, for example from about 95 to about 100 percent, coated with a primer layer, and then a layer of an acrylic resin or the mixtures of resins as depicted herein; an intermediate transfer belt comprised of a reverse double seamed substrate, and wherein the double seamed substrate is coated with a primer layer and a top layer of a mixture of a crosslinked glycoluril resin, an acrylic resin and a catalyst; and a coated seamed member inclusive of flexible belts, fuser belts, pressure belts, intermediate transfer belts, transfuse belts, transport belts, developer belts, photoreceptor belts, and the like where the coating is comprised of a first primer layer and thereover a second acrylic resin; and a process for overcoating a welded seamed belt, for example, a double welded seamed (welded twice) belt with a primer layer and a top layer of an acrylic resin, such as a layer, comprised of a glycoluril resin and a self crosslinking acrylic resin, which coating layer is mechanically robust and electrically, in embodiments, matches the surface resistivity of the seamed belt, which resistivity is, for example, from about $10^9$ to about $10^{13}$ ohm/sq.

The coated members, such as belts, flexible belts, photoreceptors, electroreceptors, and the like, can be prepared by a number of processes, such as a process which forms a strength enhancing bond between voids of mutually mating elements. The strength enhancing bond may comprise a material which is chemically and physically compatible with the material of the coating layer or layers of the belt. The resin coated welded seam or double seam smooth surface topology is determined by the hand touching thereof, and which smooth surface improves both the cleaning life of a cleaning blade and the overall service life of the flexible belt. More specifically, embodiments disclosed herein relate to a post treatment process for efficiently and consistently smoothing an ultrasonically welded mixture of a primer layer, and thereover an overcoating acrylic resin, including the resins and resin mixtures disclosed herein.

Supporting Substrate Examples

Specific examples of supporting substrates include polyimides, polyamideimides, polyetherimides, mixtures thereof, and other suitable known supporting substrates.

More specifically, examples of intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can cured at temperatures of above 300° C. such as PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

In embodiments, suitable supporting substrate polyimides include those formed from various diamines and dianhydrides, such as polyimide, polyamideimide, polyetherimide, and the like. More specifically, polyimides include aromatic polyimides, such as those formed by reacting pyromellitic acid and diaminodiphenylether, or by imidization of copolymeric acids, such as biphenyltetracarboxylic acid and pyromellitic acid with two aromatic diamines, such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane. Aromatic polyimides include those containing 1,2,1',2'-biphenyltetracarboximide and para-phenylene groups, and those having biphenyltetracarboximide functionality with diphenylether end spacer characterizations. Mixtures of polyimides can also be used.

In embodiments, the polyamideimides supporting substrate can be synthesized by at least the following two methods (1) isocyanate method which involves the reaction between isocyanate and trimellitic anhydride; or (2) acid chloride method where there is reacted a diamine and trimellitic anhydride chloride. Examples of the polyamideimides include VYLOMAX® HR-11NN (15 weight percent solution in N methylpyrrolidone, Tg=300° C., and $M_w$=45,000); HR-12N2 (30 weight percent solution in N-methylpyrrolidone/xylene/methyl ethyl ketone=50/35/15, Tg=255° C., and $M_w$=8,000); HR-13NX (30 weight percent solution in N-methylpyrrolidone/xylene=67/33, Tg=280° C., and $M_w$=10,000); HR-15ET (25 weight percent solution in ethanol/toluene=50/50, Tg=260° C., and $M_w$=10,000); HR-16NN (14 weight percent solution in N-methylpyrrolidone, Tg=320° C., and $M_w$=100,000), all commercially available from Toyobo Company of Japan; and TORLON® AI-10 (Tg=272° C.), commercially available from Solvay Advanced Polymers, LLC, Alpharetta, Ga.

Primer Layer Examples

The primer layer of various suitable thicknesses, such as for example, from about 0.01 to about 5 microns, from about 0.05 to about 1 micron, from about 0.1 to about 3 microns, and from about 0.1 to about 1 micron, and in contact with the supporting substrate of the intermediate transfer member is comprised of a silane and more specifically an aminosilane. The silane primer layer coating solution can be prepared by the simple mixing of a silane with an aliphatic alcohol, such as methanol at about a 5 weight percent solids content. The silane primer layer can be dried at temperatures of, for example, from about 20° C. to about 160° C., or from about 60° C. to about 120° C. for a suitable time period of from, for example, about 1 to about 60 minutes, or from about 5 to about 20 minutes. More specifically, the silane primer layer can be dried at about 25° C. for about 20 minutes.

Aminosilane prime layer examples are, for example, represented by

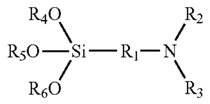

wherein $R_1$ is an alkylene group containing, for example, from 1 to about 25 carbon atoms; $R_2$ and $R_3$ are independently selected from the group consisting of at least one of hydrogen, alkyl containing, for example, from 1 to about 12 carbon atoms, and more specifically, from 1 to about 4 carbon atoms; aryl with, for example, from about 6 to about 42 carbon atoms, such as a phenyl group; and a poly(alkylene like ethylene amino) group; and $R_4$, $R_5$, and $R_6$ are independently selected from an alkyl group containing, for example, from 1 to about 10 carbon atoms, and more specifically, from 1 to about 4 carbon atoms.

Aminosilane specific examples include 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, N-2-aminoethyl-3-aminopropyl tris(ethylethoxy)silane, p-aminophenyl trimethoxysilane, N,N'-dimethyl-3-aminopropyl triethoxysilane, 3-aminopropylmethyl diethoxysilane, 3-aminopropyl trimethoxysilane, N-methylaminopropyl triethoxysilane, methyl[2-(3-trimethoxysilylpropylamino)ethylamino]-3-propionate, (N,N'-dimethyl 3-amino)propyl triethoxysilane, N,N-dimethylaminophenyl triethoxysilane, trimethoxysilyl propyldiethylene triamine, and the like, and mixtures thereof. Yet more specific aminosilane materials are 3-aminopropyl triethoxysilane (γ-APS), N-aminoethyl-3-aminopropyl trimethoxysilane, (N,N'-dimethyl-3-amino)propyl triethoxysilane, and mixtures thereof.

The aminosilane may be hydrolyzed to form a hydrolyzed silane solution. During hydrolysis of the aminosilanes, the hydrolyzable groups, such as alkoxy groups, are replaced with hydroxyl groups. The pH of the hydrolyzed silane solution can be controlled to obtain excellent characteristics on curing. A solution pH of, for example, from about 4 to about 10 can be selected, and more specifically, a pH of from about 7 to about 8. Control of the pH of the hydrolyzed silane solution may be affected with any suitable material, such as generally organic or inorganic acids. Typical organic and inorganic acids include acetic acid, citric acid, formic acid, hydrogen iodide, phosphoric acid, hydrofluorosilicic acid, p-toluene sulfonic acid, and the like.

Also, in embodiments, the aminosilane selected for the primer adhesive layer can be comprised of the aminosilanes as illustrated, for example, in U.S. application Ser. No. 12/129,948 and U.S. application Ser. No. 12/164,338, the disclosures of which are totally incorporated herein by reference.

Surface Layer Examples

The acrylic surface layer comprises a crosslinked acrylic resin, such as a self crosslinking acrylic resin, such as DORESCO® TA22-8, and when this acrylic resin is mixed with a acid catalyst, such as para-toluenesulfonic acid (p-TSA), it self crosslinks into a top layer with, for example, a surface resistivity of about 1011 ohm/sq; or an aminoplast resin, such as the glycoluril resin CYMEL® 1170 and an acrylic polyol resin, such as JONCRYL® 587, which when in the presence of an acid catalyst, such as p-TSA, the two resins crosslink with each other into a layer with a surface resistivity of, for example, about 1012 ohm/sq; or an aminoplast resin, such as the glycoluril resin CYMEL® 1170, and a self crosslinking acrylic resin, such as DORESCO® TA22-8, which when in the presence of an acid catalyst such as p-TSA, crosslink with each other into a layer with a surface resistivity of, for example, about 1,010 ohm/sq.

Each layer of the intermediate transfer member may further include a conductive component such as carbon black, a polyaniline or a metal oxide.

In embodiments, examples of the crosslinked acrylic resin, and more specifically, self crosslinking acrylic resin are illustrated in U.S. application Ser. No. 12/550,486, the disclosure of which is totally incorporated herein by reference. More specifically, examples of the selected acrylic resin, and more specifically, a self crosslinked acrylic resin, that is for example, where a crosslinking component is avoided, and crosslinking is accomplished by heating, include the resin DORESCO® TA22-8, available from Lubrizol Dock Resins, Linden, N.J., and substantially free of any conductive components dispersed within. By the addition of a small amount of an acid catalyst, the self crosslinking acrylic resin further crosslinks upon thermal curing at temperatures of, for example, from about 80° C. to about 200° C. for a suitable time period, such as for example, from about 1 to about 60 minutes, and more specifically, curing at about 160° C. for 20 minutes, resulting in a mechanically robust crosslinked acrylic resin with a surface resistivity of from about 109 to about 1,013 ohm/sq, and specifically about 1,011 ohm/sq. While the percentage of crosslinking can be difficult to determine, and not being desired to be limited by theory, the acrylic resin layer is crosslinked to a suitable value, such as for example, from about 30 to about 100 percent, and from about 50 to about 95 percent.

In embodiments, examples of the crosslinked acrylic resin selected for the top layer of the intermediate transfer member has, for example, a weight average molecular weight ($M_w$) of from about 100,000 to about 500,000, or from about 120,000 to about 200,000; a polydispersity index (PDI) ($M_w/M_n$) of from about 1.5 to about 4, or from about 2 to about 3; and a surface resistivity (at, for example, 20° C. and 50 percent humidity) of from about 108 to about 1,014 ohm/sq, or from about 109 to about 1,012 ohm/sq.

A specific example of the crosslinked acrylic resin selected for the top layer includes DORESCO® TA22-8, 30 weight percent solids, and a glass transition temperature of about 79° C., and which resin is available from Lubrizol Dock Resins, Linden, N.J., which resin in one form possesses, it is believed, a weight average molecular weight of about 160,000, a polydispersity index of about 2.3, and a surface resistivity (20° C. and 50 percent humidity) of about 1,011 ohm/sq; DORESCO® TA22-51, available from Lubrizol Dock Resins, Linden, N.J., which resin possesses a lower crosslinking density upon thermal cure as compared with DORESCO® TA22-8 resin.

Nonlimiting examples of catalysts selected for aiding in the crosslinking of the acrylic resin include oxalic acid, maleic acid, carboxylic acid, ascorbic acid, malonic acid, succinic acid, tartaric acid, citric acid, p-toluenesulfonic acid, methanesulfonic acid, and the like, and mixtures thereof. A typical concentration of the acid catalyst selected is, for example, from about 0.01 to about 5 weight percent, about 0.5 to about 4 weight percent, and about 1 to about 3 weight percent based on the weight of the crosslinked acrylic resin.

Self crosslinking acrylic resin refers, for example, to this resin being crosslinked simply by heating and, in embodiments, where a catalyst can be selected to assist in the crosslinking.

Examples of the aminoplast resins as illustrated herein and present in various suitable amounts, such as for example, from about 1 to about 99 weight percent, from about 10 to about 80 weight percent, from about 20 to about 70 weight percent, from about 30 to about 60 weight percent of the mixture together with an acrylic polyol, which is present in various suitable amounts such as for example, from about 99 to about 1 weight percent, from about 90 to about 20 weight percent, from about 80 to about 30 weight percent, from about 70 to about 40 weight percent is considered the top coating of the intermediate transfer member (ITM).

Specific examples of the aminoplast resin include glycoluril resins, melamine resins, urea resins, and benzoguanamine resins. For example, the glycoluril resins can be represented by the following formulas/structures

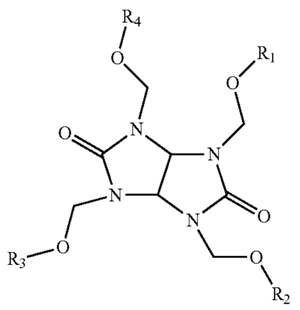

wherein each R substituent independently represents at least one of a hydrogen atom, and an alkyl with, for example, 1 to about 18 carbon atoms, from 1 to about 10 carbon atoms, from 1 to about 8 carbon atoms, or from 1 to about 4 carbon atoms.

Examples of the glycoluril resin include unalkylated and highly alkylated glycoluril resins like CYMEL® and POWDERLINK® glycoluril resins commercially available from CYTEC Industries, Inc. Specific examples of the disclosed glycoluril resin include CYMEL® 1170 (a highly butylated resin with at least 75 percent of the R groups being butyl with the remainder of the R groups being hydrogen; viscosity equal to about 3,000 to about 6,000 centipoise at 23° C.); CYMEL® 1171 (a highly methylated-ethylated with at least 75 percent of the R groups being methyl/ethyl and the remainder of the R groups being hydrogen, viscosity=to about 3,800 to about 7,500 centipoise at 23° C.); CYMEL® 1172 (an unalkylated resin with the R groups being hydrogen); and POWDERLINK® 1174 (a highly methylated resin with at least 75 percent of the R groups being methyl and the remainder of the R groups being hydrogen, a solid at 2° C.).

The number average molecular weight of the glycoluril resin is, for example, from about 200 to about 1,000, or from about 250 to about 600. The weight average molecular weight of the glycoluril resin is, for example, from about 230 to about 3,000, or from about 280 to about 1,800.

In addition to the aminoplast resin, there is present in the resin mixture an acrylic polyol resin, examples of which include copolymers of derivatives of acrylic and methacrylic acid including acrylic and methacrylic esters, and compounds containing nitrile and amide groups, and other optional monomers. The acrylic esters can be selected from, for example, the group consisting of n-alkyl acrylates wherein alky contains in embodiments from 1 to about 25 carbon atoms, such as methyl, ethyl, propyl, butyl, pentyl, hexyl, heptyl, octyl, nonyl, decyl, dodecyl, tetradecyl, or hexadecyl acrylate; secondary and branched-chain alkyl acrylates such as isopropyl, isobutyl, sec-butyl, 2-ethylhexyl, or 2-ethylbutyl acrylate; olefinic acrylates such as allyl, 2-methylallyl, furfuryl, or 2-butenyl acrylate; aminoalkyl acrylates such as 2-(dimethylamino)ethyl, 2-(diethylamino)ethyl, 2-(dibutylamino)ethyl, or 3-(diethylamino)propyl acrylate; ether acrylates such as 2-methoxyethyl, 2-ethoxyethyl, tetrahydrofurfuryl, or 2-butoxyethyl acrylate; cycloalkyl acrylates such as cyclohexyl, 4-methylcyclohexyl, or 3,3,5-trimethylcyclohexyl acrylate; halogenated alkyl acrylates such as 2-bromoethyl, 2-chloroethyl, or 2,3-dibromopropyl acrylate; glycol acrylates and diacrylates such as ethylene glycol, propylene glycol, 1,3-propanediol, 1,4-butanediol, diethylene glycol, 1,5-pentanediol, triethylene glycol, dipropylene glycol, 2,5-hexanediol, 2,2-diethyl-1,3-propanediol, 2-ethyl-1,3-hexanediol, or 1,10-decanediol acrylate, and diacrylate. Examples of methacrylic esters can be selected from, for example, the group consisting of alkyl methacrylates such as methyl, ethyl, propyl, isopropyl, n-butyl, isobutyl, sec-butyl, t-butyl, n-hexyl, n-octyl, isooctyl, 2-ethylhexyl, n-decyl, or tetradecyl methacrylate; unsaturated alkyl methacrylates such as vinyl, allyl, oleyl, or 2-propynyl methacrylate; cycloalkyl methacrylates such as cyclohexyl, 1-methylcyclohexyl, 3-vinylcyclohexyl, 3,3,5-trimethylcyclohexyl, bornyl, isobornyl, or cyclopenta-2,4-dienyl methacrylate; aryl methacrylates such as phenyl, benzyl, or nonylphenyl methacrylate; hydroxyalkyl methacrylates such as 2-hydroxyethyl, 2-hydroxypropyl, 3-hydroxypropyl, or 3,4-dihydroxybutyl methacrylate; ether methacrylates such as methoxymethyl, ethoxymethyl, 2-ethoxyethoxymethyl, allyloxymethyl, benzyloxymethyl, cyclohexyloxymethyl, 1-ethoxyethyl, 2-ethoxyethyl, 2-butoxyethyl, 1-methyl-(2-vinyloxy)ethyl, methoxymethoxyethyl, methoxyethoxyethyl, vinyloxyethoxyethyl, 1-butoxypropyl, 1-ethoxybutyl, tetrahydrofurfuryl, or furfuryl methacrylate; oxiranyl methacrylates such as glycidyl, 2,3-epoxybutyl, 3,4-epoxybutyl, 2,3-epoxycyclohexyl, or 10,11-epoxyundecyl methacrylate; aminoalkyl methacrylates such as 2-dimethylaminoethyl, 2-diethylaminoethyl, 2-t-octylaminoethyl, N,N-dibutylaminoethyl, 3-diethylaminopropyl, 7-amino-3,4-dimethyloctyl, N-methylformamidoethyl, or 2-ureidoethyl methacrylate; glycol dimethacrylates such as methylene, ethylene glycol, 1,2-propanediol, 1,3-butanediol, 1,4-butanediol, 2,5-dimethyl-1,6-hexanediol, 1,10-decanediol, diethylene glycol, or triethylene glycol dimethacrylate; trimethacrylates such as trimethylolpropane trimethacrylate; carbonyl-containing methacrylates such as carboxymethyl, 2 carboxyethyl, acetonyl, oxazolidinylethyl, N-(2-methacryloyloxyethyl)-2-pyrrolidinone, N-methacryloyl-2-pyrrolidinone, N-(metharyloyloxy)formamide, N-methacryloylmorpholine, or tris(2-methacryloxyethyl)amine methacrylate; other nitrogen-containing methacrylates such as 2-methacryloyloxyethylmethyl cyanamide, methacryloyloxyethyl trimethylammonium chloride, N-(methacryloyloxy-ethyl) diisobutylketimine, cyanomethyl, or 2-cyanoethyl methacrylate; halogenated alkyl methacrylates such as chloromethyl, 1,3-dichloro-2-propyl, 4-bromophenyl, 2-bromoethyl, 2,3-dibromopropyl, or 2-iodoethyl methacrylate; sulfur-containing methacrylates such as methylthiol, butylthiol, ethylsulfonylethyl, ethylsulfinylethyl, thiocyanatomethyl, 4-thiocyanatobutyl, methylsulfinylmethyl, 2-dodecylthioethyl methacrylate, or bis(methacryloyloxyethyl) sulfide; phosphorous-boron-silicon-containing methacrylates such as 2-(ethylenephosphino)propyl, dimethylphosphinomethyl, dimethylphosphonoethyl, diethylphosphatoethyl, 2-(dimethylphosphato)propyl, 2-(dibutylphosphono)ethyl methacrylate, diethyl methacryloylphosphonate, dipropyl methacryloyl phosphate, diethyl methacryloyl phosphite, 2-methacryloyloxyethyl diethyl phosphite, 2,3-butylene methacryloyl-oxyethyl borate, or methyldiethoxymethacryloyloxyethoxysilane. Methacrylic amides and nitriles can be selected from the group consisting of at least one of N-methylmethacrylamide, N-isopropylmethacrylamide, N-phenylmethacrylamide, N-(2-hydroxyethyl)methacrylamide, 1-methacryloylamido-2-methyl-2-propanol, 4-methacryloylamido-4-methyl-2-pentanol, N-(methoxymethyl)methacrylamide, N-(dimethylaminoethyl)methacrylamide, N-(3-dimethylaminopropyl)methacrylamide, N-acetylmethacrylamide, N-methacryloylmaleamic acid, methacryloylamido acetonitrile, N-(2-cyanoethyl) methacrylamide, 1-methacryloylurea, N-phenyl-N-phenylethylmethacrylamide, N-(3-d ibutylaminopropyl)methacrylamide, N,N-diethylmethacrylamide, N-(2-cyanoethyl)-N-methylmethacrylamide, N,N-bis(2-diethylaminoethyl) methacrylamide, N-methyl-N-phenylmethacrylamide, N,N'-methylenebismethacrylamide, N,N'-ethylenebismethacrylamide, or N-(diethylphosphono) methacrylamide. Further optional monomer examples selected are styrene, acrolein, acrylic anhydride, acrylonitrile, acryloyl chloride, methacrolein, methacrylonitrile, methacrylic anhydride, methacrylic acetic anhydride, methacryloyl chloride, methacryloyl bromide, itaconic acid, butadiene, vinyl chloride, vinylidene chloride, or vinyl acetate.

Specific examples of acrylic polyol resins include PARALOID™ AT-410 (acrylic polyol, 73 percent in methyl amyl ketone, Tg=30° C., OH equivalent weight=880, acid number=25, $M_w$=9,000), AT-400 (acrylic polyol, 75 percent in methyl amyl ketone, Tg=15° C., OH equivalent weight=650, acid number=25, $M_w$=15,000), AT-746 (acrylic polyol, 50 percent in xylene, Tg=83° C., OH equivalent weight=1,700, acid number=15, $M_w$=45,000), AE-1285 (acrylic polyol, 68.5 percent in xylene/butanol=70/30, Tg=23° C., OH equivalent weight=1,185, acid number=49, $M_w$=6,500), and AT-63 (acrylic polyol, 75 percent in methyl amyl ketone, Tg=25° C., OH equivalent weight=1,300, acid number=30), all available from Rohm and Haas, Philadelphia, Pa.; JONCRYL® 500 (styrene acrylic polyol, 80 percent in methyl amyl ketone, Tg=−5° C., OH equivalent weight=400), 550 (styrene acrylic polyol, 62.5 percent in PM-acetate/toluene=65/35, OH equivalent weight=600), 551 (styrene acrylic polyol, 60 percent in xylene, OH equivalent weight=600), 580 (styrene acrylic polyol, Tg=50° C., OH equivalent weight=350, acid number=10, $M_w$=15,000), 942 (styrene acrylic polyol, 73.5 percent in n-butyl acetate, OH equivalent weight=400), and 945 (styrene acrylic polyol, 78 percent in n-butyl acetate, OH equivalent weight=310), all available from Johnson Polymer, Sturtevant, Wis.; RU-1100-1k™ with a $M_n$ of 1,000 and 112 hydroxyl value, and RU 1550-k5™ with a $M_n$ of 5,000 and 22.5 hydroxyl value, both available from Procachem Corp.; G-CURE™ 108A70, available from Fitzchem Corp.; NEOL® polyol, available from BASF; TONE™ 0201 polyol with a $M_n$ of 530, a hydroxyl number of 117, and acid number of <0.25, available from Dow Chemical Company.

The number average molecular weight of the polyol resin is, for example, from about 400 to about 50,000 or from about 1,000 to about 10,000. The weight average molecular weight of the polyol resin is, for example, from about 500 to about 100,000 or from about 1,500 to about 20,000. The polyol resin is present in an amount of, for example, from about 1 to about 99, about 10 to about 80 weight percent, or from about 30 to about 50 weight percent of the total overcoated layer components. By the addition of a small amount of an acid catalyst, the mixture of the aminoplast resin such as the glycoluril resin and the acrylic polyol resin crosslinks upon thermal curing at temperatures of, for example, from about 80° C. to about 200° C. for a suitable time period, such as for example, from about 1 to about 60 minutes, and more specifically, curing at about 160° C. for 20 minutes, resulting in a mechanically robust mixture of a glycoluril resin and a polyol resin layer with a surface resistivity of from about 109 to about 1,013 ohm/sq, and specifically about 1,012 ohm/sq. While the percentage of crosslinking can be difficult to determine, and not being desired to be limited by theory, the mixture of the glycoluril resin and the acrylic polyol resin layer is crosslinked to a suitable value, such as for example, from about 30 to about 100 percent, or from about 50 to about 95 percent.

As the third alternative embodiment there is selected for the top coating of the ITM a mixture of an aminoplast resin and a self crosslinking acrylic resin, examples of these resins being illustrated herein. The aminoplast resin is present in various suitable amounts, such as for example, from about 99 to about 1 weight percent, from about 50 to about 99 weight percent, from about 60 to about 90 weight percent, from about 80 to about 95 weight percent of the mixture; and the crosslinked acrylic resin present in various suitable amounts, such as for example, from about 1 to about 99 weight percent, from about 1 to about 50 weight percent, from about 10 to about 40 weight percent, from about 5 to about 20 weight percent of the mixture, and where the total of the two resins in the mixture is about 100 percent.

The thickness of each of the layers of the ITM illustrated herein are for the supporting substrate from about 50 to about 400 microns, or from about 150 to about 300 microns; for the first silane layer the thickness is from about 0.01 to about 5 microns or from about 0.05 to about 1 micron; and the thickness of second layer is from about 5 to about 150 microns, or from about 10 to about 70 microns.

The circumference of the transfer member in a film or belt configuration of from 1 to 2, or more layers is, for example, from about 250 to about 2,500 millimeters, from about 1,500 to about 2,500 millimeters, or from about 2,000 to about 2,200 millimeters. The width of the film or belt is, for example, from about 100 to about 1,000 millimeters, from about 200 to about 500 millimeters, or from about 300 to about 400 millimeters. The thickness of the film or belt is, for example, from about 25 to about 500 microns, or from about 50 to 150 microns.

A blocking agent can also be included in the coating resin mixture illustrated herein, which agent can "tie up" or substantially block the acid catalyst effect to provide solution stability until the acid catalyst function is initiated. Thus, for example, the blocking agent can block the acid effect until the solution temperature is raised above a threshold temperature. For example, some blocking agents can be used to block the acid effect until the solution temperature is raised above about 100° C. At that time, the blocking agent dissociates from the acid and vaporizes, and the unassociated acid is then free to act as a catalyst. Examples of such suitable blocking agents include, but are not limited to, pyridine and commercial acid solutions containing blocking agents, such as CYCAT® 4045, available from Cytec Industries Inc.

The disclosed seam or doubled seamed top coating further optionally includes thereon as a coating layer a siloxane component or a fluoro component, each present in an amount of, for example, from about 0.1 to about 20 weight percent, or from about 0.5 to about 5 weight percent, which component can co-crosslink with the resins or resin mixtures, and thereby render an overcoat with excellent slippery characteristics.

Examples of the crosslinkable siloxane component include hydroxyl derivatives of silicone modified polyacrylates such as BYK-SILCLEAN® 3700; polyether modified acryl polydimethylsiloxanes such as BYK-SILCLEAN® 3710; and polyether modified hydroxyl polydimethylsiloxanes such as BYK-SILCLEAN® 3720.

Examples of the crosslinkable fluoro component that may be selected include (1) hydroxyl derivatives of perfluoropolyoxyalkanes such as FLUOROLINK® D (M.W. of about 1,000 and a fluorine content of about 62 percent), FLUOROLINK® D10-H (M.W. of about 700 and fluorine content of about 61 percent), and FLUOROLINK® D10 (M.W. of about 500 and fluorine content of about 60 percent) (functional group —CH2OH); FLUOROLINK® E (M.W. of about 1,000 and a fluorine content of about 58 percent), and FLUOROLINK® E10 (M.W. of about 500 and fluorine content of about 56 percent) (functional group $—CH_2(OCH_2CH_2)_nOH$); FLUOROLINK® T (M.W. of about 550 and fluorine content of about 58 percent), and FLUOROLINK® T10 (M.W. of about 330 and fluorine content of about 55 percent) (functional group $—CH_2OCH_2CH(OH)CH_2OH$); (2) hydroxyl derivatives of perfluoroalkanes ($RfCH_2CH_2OH$, wherein $Rf{=}F(CF_2CF_2)_n$) wherein n represents the number of groups, such as about 1 to about 50, such as ZONYL® BA (M.W. of about 460 and fluorine content of about 71 percent), ZONYL® BA-L (M.W. of about 440 and fluorine content of about 70 percent), ZONYL® BA-LD (M.W. of about 420 and fluorine content of about 70 percent), and ZONYL® BA-N (M.W. of about 530 and fluorine content of about 71 percent); (3) carboxylic acid derivatives of fluoropolyethers such as FLUOROLINK® C (M.W. of about 1,000 and fluorine content of about 61 percent); (4) carboxylic ester derivatives of fluoropolyethers such as FLUOROLINK® L (M.W. of about 1,000 and fluorine content of about 60 percent), FLUOROLINK® L10 (M.W. of about 500 and fluorine content of about 58 percent); (5) carboxylic ester derivatives of perfluoroalkanes ($RfCH_2CH_2O(C{=}O)R$ wherein $Rf{=}F(CF_2CF_2)_n$, and n is as illustrated herein, and R is alkyl) such as ZONYL® TA-N (fluoroalkyl acrylate, $R{=}CH_2{=}CH—$, M.W. of about 570 and fluorine content of about 64 percent), ZONYL® TM (fluoroalkyl methacrylate, $R{=}CH_2{=}C(CH_3)—$, M.W. of about 530 and fluorine content of about 60 percent), ZONYL® FTS (fluoroalkyl stearate, $R{=}C_{17}H_{35}—$, M.W. of about 700 and fluorine content of about 47 percent), ZONYL® TBC (fluoroalkyl citrate, M.W. of about 1,560 and fluorine content of about 63 percent); (6) sulfonic acid derivatives of perfluoroalkanes ($RfCH_2CH_2SO_3H$, wherein Rf=F $(CF_2CF_2)_n$), and n is as illustrated herein, such as ZONYL® TBS (M.W. of about 530 and fluorine content of about 62 percent); (7) ethoxysilane derivatives of fluoropolyethers such as FLUOROLINK® S10 (M.W. of about 1,750 to about 1,950); and (8) phosphate derivatives of fluoropolyethers such as FLUOROLINK® F10 (M.W. of about 2,400 to about 3,100). The FLUOROLINK® additives are available from Ausimont USA, and the ZONYL® additives are available from E.I. DuPont.

Examples of additional optional components present in at least one layer of the ITM include a number of known conductive components, such as a polyaniline, carbon black or a metal oxide, each present in an amount of from about 0.1 to about 60 weight percent, from about 1 to about 30 weight percent, or from about 3 to about 15 weight percent.

In embodiments, the polyaniline component selected has a relatively small particle size of, for example, from about 0.5 to about 5 microns, from about 1.1 to about 2.3 microns, from about 1.2 to about 2 microns, from about 1.5 to about 1.9 microns, or about 1.7 microns. Specific examples of polyanilines selected for the overcoat layer are PANIPOL™ F, commercially available from Panipol Oy, Finland; and lignosulfonic acid grafted polyaniline.

Examples of carbon blacks selected as the conductive component include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN®® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); and Channel carbon blacks available from Evonik-Degussa. Specific examples of conductive carbon blacks are Special Black 4 (B.E.T. surface area=180 $m^2/g$, DBP absorption=1.8 ml/g, primary particle diameter=25 nanometers), Special Black 5 (B.E.T. surface area=240 $m^2/g$, DBP absorption=1.41 ml/g, primary particle diameter=20 nanometers), Color Black FW1 (B.E.T. surface area=320 $m^2/g$, DBP absorption=2.89 ml/g, primary particle diameter=13 nanometers), Color Black FW2 (B.E.T. surface area=460 $m^2/g$, DBP absorption=4.82 ml/g, primary particle diameter=13 nanometers), and Color Black FW200 (B.E.T. surface area=460 $m^2/g$, DBP absorption=4.6 ml/g, primary particle diameter=13 nanometers).

Examples of metal oxides selected as a conductive component include tin oxide, antimony doped tin oxide, indium oxide, indium tin oxide, zinc oxide, and titanium oxide.

The end marginal regions of the intermediate transfer member can be joined by any suitable means including gluing, taping, stapling, pressure, and heat fusing to form a continuous member such as a belt, sleeve, or cylinder. Both heat and pressure can be used to bond the end marginal regions into a seam in the overlap region. The flexible member may thus be comprised of a first exterior major surface or side, and a second exterior major surface opposite the first exterior surface. The seam joins the flexible member so that the bottom surface, generally including at least one layer immediately above, at and/or near the first end marginal region, is integral with the top surface, generally including at least one layer immediately below, at and/or near the second end marginal region.

A heat and pressure seam joining means for the ITM disclosed herein includes ultrasonic welding to transform the sheet of an intermediate transfer material into an intermediate transfer belt. The belt can be fabricated by ultrasonic welding of the overlapped opposite end regions of a sheet. In the ultrasonic seam welding process, ultrasonic energy applied to the overlap region is used to melt suitable layers.

Ultrasonic welding is selected, in embodiments, for joining the flexible intermediate transfer member because it is rapid, clean, solvent free, of low cost, relatively safe, and it produces a thin narrow seam. In addition, ultrasonic welding is selected since the mechanical high frequency pounding of the welding horn causes the generation of heat at the contiguous overlapping end marginal regions of the flexible imaging sheet loop to maximize melting of one or more layers therein to form a strong and defined seam joint. For example, ultrasonic welding and an apparatus for performing the same are disclosed in U.S. Pat. No. 4,532,166, the disclosure of which is totally incorporated herein by reference.

In a specific embodiment, the heat and pressure applying tool is an ultrasonic vibrating horn where the lower anvil selected may be a flat anvil, and where the tool smoothes out the rough seam region by proceeding with a second welding pass across the welded region such that the rough seam region is further compressed under high pressure and heat. Since the post treatment smoothing process uses the welding horn to further compress the overlap, rather than removing the protruding material, seam strength is not substantially degraded. Moreover, the welded seam may be double welded from the back side of the seam as well. In such embodiments, the second welding pass is accomplished with the seam inverted on the anvil so that the imaging side of the belt is facing down on the anvil. In this manner, the overlap on the image side of the belt can be substantially eliminated as it conforms to the smooth surface of the anvil.

The heat and pressure applying tool is, in embodiments, an automated heated pressure roller or a heated upper anvil. In these embodiments, the lower anvil is a round anvil, and an edge of the seam region is positioned on an apex of the lower anvil, and where a smooth seam with no protrusion results by traversing the automated heated pressure roller along the seam to reform the edge of the seam region. The heated pressure roller applies pressure on the welded seam against the lower anvil while heating the seam such that a smooth welded seam is produced with the belt held in place by a vacuum on the lower anvil while the heated pressure roller traverses the seam. To effectively heat roll the seam smooth, the roller to the seam is positioned so as to be located on the apex of the anvil to fully expose the area to be smoothed. The surface of the roller should be tangent to the anvil's apex.

Using a round anvil allows heat and pressure to be concentrated along the edge of the overlap. In further embodiments, the heated pressure roller is used in an automated system where the heated roller is affixed to a linear actuator which drives it tangent to the roller's apex along its length. Temperature may be controlled by means of a thermostat controller while pressure may be controlled by spring tension.

By applying the heated upper anvil to the edge of the seam region, where the welded seam is sandwiched between the upper and lower anvils, the welded seam is thus compressed under high pressure. Both the upper and lower anvils may be heated so that during the compression the seam material is also heated close to its glass transition temperature to further facilitate the reformation of the welded seam and to produce a smooth welded seam. The upper and lower anvils may be heated by heating components embedded in the upper and lower anvils, and which are controlled by a thermostatic controller. In this embodiment, the welded seam may be reduced in seam thickness by from about 25 to about 35 percent.

The following Examples are provided.

Comparative Example 1

A dual layer intermediate transfer member was prepared as follows. On top of a 76.3 micron thick intermediate transfer sheet comprised of a mixture of 91 weight percent of KAPTON® KJ (available from E.I. DuPont) and 9 weight percent of polyaniline (1.7 microns in diameter size), there was coated an acrylic surface layer, which layer coating solution was comprised of the crosslinked acrylic resin, DORESCO® TA22-8, obtained from Lubrizol; and a p-toluenesulfonic (p-TSA) acid catalyst in a ratio of 98/2 in an ethanol/acetone/DOWANOL® solvent mixture, about 20 weight percent solids. After thermal cure at about 160° C. for 20 minutes, a 20 micron thick acrylic surface layer was obtained.

Comparative Example 2

A dual layer intermediate transfer member was prepared as follows. On top of a 76.3 micron thick intermediate transfer sheet comprised of a mixture of 91 weight percent of KAPTON® KJ (available from E.I. DuPont) and 9 weight percent of polyaniline (1.7 microns in diameter size), an acrylic surface layer was coated, which layer coating solution was comprised of CYMEL® 1170, a highly butylated glycoluril resin with at least 75 percent of the R groups being butyl and the remaining R groups being hydrogen; viscosity=3,000 to 6,000 centipoise at 23° C., commercially available from CYTEC Industries, Inc.; JONCRYL® 580, a styrene acrylic polyol resin, $T_g$=50° C., OH equivalent weight=350, acid number=10, $M_w$=15,000, commercially available from Johnson Polymers; and the p-toluenesulfonic (p-TSA) acid catalyst in a ratio of 49/49/2 in DOWANOL®, about 20 weight percent solids. After thermal cure at about 160° C. for 20 minutes, a 20 micron thick acrylic surface layer was obtained.

Comparative Example 3

A dual layer intermediate transfer member was prepared as follows. On top of a 76.3 micron thick intermediate transfer sheet comprised of a mixture of 91 weight percent of KAPTON® KJ (available from E.I. DuPont) and 9 weight percent of polyaniline (1.7 microns in diameter size), an acrylic surface layer was coated, which layer coating solution was comprised of the self crosslinking acrylic resin, DORESCO® TA22-8, obtained from Lubrizol; the conductive color black FW-1, obtained from Evonik; and a p-toluenesulfonic (p-TSA) acid catalyst in a ratio of 95/3/2 in an ethanol/acetone/DOWANOL® solvent mixture, about 20 weight percent solids. After thermal cure at about 160° C. for 20 minutes, a 20 micron thick acrylic surface layer was obtained.

Comparative Example 4

A dual layer intermediate transfer member was prepared as follows. On top of a 76.3 micron thick intermediate transfer sheet comprised of a mixture of 91 weight percent of KAPTON® KJ (available from E.I. DuPont) and 9 weight percent of polyaniline (1.7 microns in diameter size), an acrylic surface layer was coated, which layer coating solution was comprised of CYMEL® 1170, a highly butylated glycoluril resin with at least 75 percent of the R groups being butyl and the remaining R groups being hydrogen; viscosity=3,000 to 6,000 centipoise at 23° C., commercially available from CYTEC Industries, Inc.; JONCRYL® 580, a styrene acrylic polyol resin, $T_g$=50° C., OH equivalent weight=350, acid number=10, $M_w$=15,000, commercially available from Johnson Polymers; the conductive color black FW-1, obtained from Evonik; and the p-toluenesulfonic (p-TSA) acid catalyst in a ratio of 47/47/4/2 in DOWANOL®, about 20 weight percent solids. After thermal cure at about 160° C. for 20 minutes, a 20 micron thick acrylic surface layer was obtained.

Example I

A three layer intermediate transfer member was prepared by repeating the process of Comparative Example 1 except that there was situated between the polyimide bottom layer and the acrylic surface layer, a silane primer layer for adhesion enhancement between the bottom layer and the surface layer, which silane layer coating solution was prepared by mixing 3-aminopropyl triethoxysilane (γ-APS) (5 parts) and methanol (95 parts). The silane primer layer was dried at 25° C. for 20 minutes, resulting in a 0.2 micron thick primer layer.

Example II

A three layer intermediate transfer member was prepared by repeating the process of Comparative Example 2 except that there was situated between the polyimide bottom layer and the acrylic surface layer, a silane primer layer for adhesion enhancement between the bottom layer and the surface layer, which silane layer coating solution was prepared by mixing 3-aminopropyl triethoxysilane (γ-APS) (5 parts) and methanol (95 parts). The silane primer layer was dried at 25° C. for 20 minutes, resulting in a 0.2 micron thick primer layer.

Example III

A three layer intermediate transfer member was prepared by repeating the process of Comparative Example 3 except that between the polyimide bottom layer and the acrylic surface layer there was incorporated a silane primer layer for adhesion enhancement between the bottom layer and the surface layer, which silane layer coating solution was prepared by mixing 3-aminopropyl triethoxysilane (γ-APS) (5 parts) and methanol (95 parts). The silane primer layer was dried at 25° C. for 20 minutes, resulting in a 0.2 micron thick primer layer.

Example IV

A three layer intermediate transfer member was prepared by repeating the process of Comparative Example 4 except that between the polyimide bottom layer and the acrylic surface layer there was incorporated a silane primer layer for adhesion enhancement between the bottom layer and the surface layer, which silane layer coating solution was prepared by mixing 3-aminopropyl triethoxysilane (γ-APS) (5 parts) and methanol (95 parts). The silane primer layer was dried at 25° C. for 20 minutes resulting in a 0.2 micron thick primer layer.

Adhesion Tests

The above prepared intermediate transfer members were tested for layer/layer adhesion as follows.

A 180 degree peel strength measurement (adhesion test) was carried out by cutting a minimum of three 1 inch times 6 inches intermediate transfer member samples. For each sample, the surface layer (second layer) was partially stripped from the test sample with the aid of a razor blade, and then hand peeled to about 3.5 inches from one end to expose the substrate support layer inside the sample. This stripped sample was then secured to a 2 inches by 6 inches, and 0.25 inch thick aluminum backing plate (having the second layer facing the backing plate) with the aid of two sided adhesive tape. The end of the resulting assembly, opposite the end from which the second layer was not stripped, was inserted into the upper jaw of an Instron Tensile Tester. The free end of the partially peeled second layer was inserted into the lower jaw of the Instron Tensile Tester. The jaws were then activated at a one inch per minute crosshead speed to peel the sample at least two inches at an angle of 180 degrees. The load recorded was then calculated to give the peel strength of the test sample. The peel strength was determined to be the load required for stripping the second layer off from the substrate support layer divided by the width (1 inch or 2.54 centimeter) of the test sample. The peel strength results are shown in Table 1. The higher the peel strength value, the better the layer/layer adhesion. When the peel strength is greater than 30 grams/centimeter, it is referred to as DNP (does not peel).

TABLE 1

| | Peel Strength (grams/centimeter) |
|---|---|
| Comparative Example 1, Self Crosslinking Acrylic Resin Second Layer | 5.1 |
| Example I, Silane Layer | Does Not Peel |
| Comparative Example 2, Glycoluril Resin/Acrylic Polyol Resin Second Layer | 4.5 |
| Example II, Silane Layer | Does Not Peel |
| Comparative Example 3, Carbon Black/Self Crosslinking Acrylic Resin Second Layer | 3.3 |
| Example III, Silane Layer | Does Not Peel |
| Comparative Example 4, Carbon Black Glycoluril Resin/Acrylic Polyol Resin Second Layer | 2.6 |
| Example IV, Silane Layer | Does Not Peel |

In all four Comparative Examples, where no silane layer was present, the layer/layer adhesion was poor with the peel strength being 5.1 or less grams/centimeter. As comparison, in all four Examples where the silane layer was present, the layer/layer adhesion was strong with a peel strength greater than 30 grams/centimeter, such as 37 grams/centimeter (does not peel).

Thus, the three layer intermediate transfer members comprising a polyimide support layer, a silane primer layer, and a second layer exhibited strong layer/layer adhesion.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a supporting substrate, a silane first intermediate layer, and contained on the silane layer a second layer of an optional acid catalyst, and a mixture of a glycoluril resin and an acrylic polyol resin, or a mixture of a glycoluril resin and a crosslinked acrylic resin, an optional outer release layer positioned on said second layer, and wherein said intermediate transfer member accepts a xerographic developed toner image from a photoconductor, and subsequently transfers said image to a substrate.

2. An intermediate transfer member in accordance with claim 1 wherein said supporting substrate consists of a polymer selected from the group consisting of a polyimide, a polycarbonate, a polyamideimide, a polyphenylene sulfide, a polyamide, a polysulfone, a polyetherimide, a polyester or polyester copolymer, a polyvinylidene fluoride, a polyethylene-co-polytetrafluoroethylene, and mixtures thereof, and said supporting substrate includes at least one seam.

3. An intermediate transfer member in accordance with claim 2 wherein said supporting substrate is a polyimide that contains a polyaniline, carbon black, or mixtures thereof, and said at least one seam is one seam or two seams, and said crosslinked acrylic resin is crosslinked to a value of from about 50 to about 95 percent.

4. An intermediate transfer member in accordance with claim 1 wherein said supporting substrate consists of a metal oxide and a polymer selected from the group consisting of a polyimide, a polycarbonate, a polyamideimide, a polyphenylene sulfide, a polyamide, a polysulfone, a polyetherimide, a polyester or polyester copolymer, a polyvinylidene fluoride, and a polyethylene-co-polytetrafluoroethylene.

5. An intermediate transfer member in accordance with claim 1 wherein said mixture of said glycoluril resin and said acrylic polyol resin consists of from about 1 to about 99 weight percent of said glycoluril resin, and from 99 to about 1 weight percent of said acrylic polyol resin, and wherein the total thereof is about 100 percent, and said crosslinked acrylic resin is crosslinked to a value of from about 50 to about 100 percent.

6. An intermediate transfer member in accordance with claim 1 wherein said mixture of said glycoluril resin and said acrylic polyol resin consists of from about 55 to about 85 weight percent of said glycoluril resin, and from 45 to about 15 weight percent of said acrylic polyol resin, and wherein the total thereof is about 100 percent.

7. An intermediate transfer member in accordance with claim 1 wherein said glycoluril resin is represented by

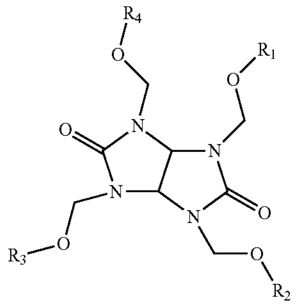

wherein each R group is at least one of hydrogen and alkyl.

8. An intermediate transfer member in accordance with claim 7 wherein said glycoluril resin possesses a number average molecular weight of from about 200 to about 1,000, and a weight average molecular weight of from about 230 to about 3,000, and each R group is alkyl with from about 1 to about 4 carbon atoms.

9. An intermediate transfer member in accordance with claim 7 wherein said glycoluril resin possesses a number average molecular weight of from about 250 to about 600, and a weight average molecular weight of from about 280 to about 1,800, and each R group is n-butyl, isobutyl, methyl, or ethyl.

10. An intermediate transfer member in accordance with claim 1 wherein said crosslinked acrylic resin is a self crosslinked resin and possesses a bulk resistivity of from about $10^8$ to about $10^{14}$ ohm/sq.

11. An intermediate transfer member in accordance with claim 1 wherein said crosslinked acrylic resin possesses a bulk resistivity, at about 20° C. and at about 50 percent relative humidity, of from about $10^9$ to about $10^{12}$ ohm/sq.

12. An intermediate transfer member in accordance with claim 1 wherein said crosslinked acrylic resin possesses a weight average molecular weight ($M_w$) of from about 100,000 to about 500,000, and a polydispersity index (PDI) ($M_w/M_n$) of from about 1.5 to about 4.

13. An intermediate transfer member in accordance with claim 1 wherein said crosslinked acrylic resin possesses a weight average molecular weight ($M_w$) of from about 120,000 to about 200,000, and a polydispersity index (PDI) ($M_w/M_n$) of from about 2 to about 3.

14. An intermediate transfer member in accordance with claim 1 wherein said crosslinked acrylic resin is crosslinked by heating.

15. An intermediate transfer member in accordance with claim 1 wherein said mixture of said glycoluril resin and said acrylic polyol resin includes said acid catalyst selected in an amount of from about 0.1 to about 5 weight percent, and a siloxane component, or a fluoro component, each selected in an amount of from about 0.1 to about 15 weight percent.

16. An intermediate transfer member in accordance with claim 15 wherein said acid catalyst is a toluenesulfonic acid; said siloxane component is a hydroxyl derivative of a silicone modified polyacrylate, a polyether modified acryl polydimethylsiloxane, or a polyether modified hydroxyl polydimethylsiloxane; said fluoro component is at least one of hydroxyl perfluoropolyoxyalkanes, hydroxyl perfluoroalkanes, carboxylic acid fluoropolyethers, carboxylic ester fluoropolyethers, carboxylic ester perfluoroalkanes, sulfonic acid perfluoroalkanes, silane fluoropolyethers, and phosphate fluoropolyethers; and said substrate includes one seam or two seams.

17. An intermediate transfer member in accordance with claim 1 wherein said outer release layer positioned on said second layer is present, and wherein said release layer comprises a fluorinated ethylene propylene copolymer, a polytetrafluoroethylene, a polyfluoroalkoxy polytetrafluoroethylene, a fluorosilicone, a copolymer or terpolymer of vinylidenefluoride, hexafluoropropylene, tetrafluoroethylene, or mixtures thereof.

18. An intermediate transfer member in accordance with claim 1 where the thickness of said supporting substrate is from about 50 to about 400 microns; the thickness of said first silane layer is from about 0.01 to about 5 microns; and the thickness of said second layer is from about 5 to about 150 microns.

19. An intermediate transfer member in accordance with claim 1 where the thickness of said supporting substrate is from about 70 to about 150 microns; the thickness of said first silane layer is from about 0.05 to about 1 micron; and the thickness of said second layer is from about 15 to about 50 microns.

20. An intermediate transfer member in accordance with claim 1 wherein said supporting substrate is a polyimide; said crosslinked acrylic resin possesses a weight average molecular weight ($M_w$) of from about 100,000 to about 500,000, or from about 120,000 to about 200,000; a polydispersity index (PDI) ($M_w/M_n$) of from about 1.5 to about 4; and a surface resistivity of from about $10^8$ to about $10^{14}$ ohm/sq; said glycoluril resin is represented by

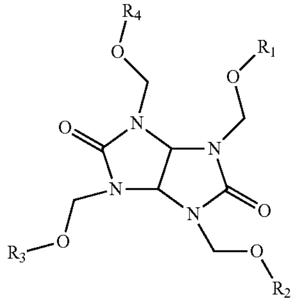

and wherein said glycoluril resin possesses a number average molecular weight of from about 200 to about 1,000, and a weight average molecular weight of from about 230 to about 3,000, and each R group is alkyl with from about 1 to about 4 carbon atoms; said acrylic polyol resin is a hydroxyl copolymer of an alkyl acrylic and a methacrylic ester, wherein alkyl contains from about 1 to about 6 carbon atoms; and said silane is represented by

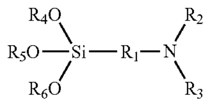

wherein $R_1$ is alkylene with from 1 to about 25 carbon atoms; $R_2$ and $R_3$ are independently selected from the group consisting of at least one of hydrogen, alkyl containing from 1 to about 12 carbon atoms, and aryl with from about 6 to about 42 carbon atoms, and $R_4$, $R_5$, and $R_6$ are independently selected from an alkyl group containing from 1 to about 10 carbon atoms.

21. An intermediate transfer member in accordance with claim 20 wherein said glycoluril resin/acrylic polyol resin mixture is crosslinked in the presence of said acid catalyst; and said silane is 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, or N-2-aminoethyl-3-aminopropyl trimethoxysilane.

22. An intermediate transfer member in accordance with claim 20 wherein said glycoluril resin/acrylic polyol resin mixture is crosslinked in the presence of said acid catalyst of para-toluenesulfonic acid; and wherein said silane is 3-aminopropyl triethoxysilane.

23. An intermediate transfer member in accordance with claim 20 wherein at least one of said supporting substrate, and said second layer further includes a conductive component of carbon black, a polyaniline, or a metal oxide.

24. An intermediate transfer belt in accordance with claim 1 wherein said second layer consists of a mixture of a glycoluril resin and an acrylic polyol resin.

25. An intermediate transfer member consisting of and in sequence, of a polyimide supporting substrate, a first intermediate adhesive silane layer, and contained on the silane layer a second layer selected from the group consisting of a crosslinked mixture of a glycoluril resin and an acrylic polyol resin, and a crosslinked mixture of a glycoluril resin and a crosslinked acrylic resin, wherein said crosslinking is from about 50 to about 100 percent; said crosslinked acrylic resin possesses a weight average molecular weight ($M_w$) of from about 120,000 to about 200,000, said glycoluril resin is represented by

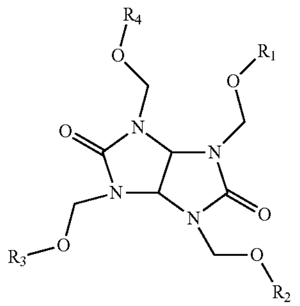

each R group is alkyl with from about 1 to about 6 carbon atoms; and said silane is an aminosilane selected from 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, N-2-aminoethyl-3-aminopropyl tris(ethylethoxy) silane, p-aminophenyl trimethoxysilane, N,N'-dimethyl-3-aminopropyl triethoxysilane, 3-aminopropylmethyl diethoxysilane, 3-aminopropyl trimethoxysilane, N-methylaminopropyl triethoxysilane, methyl[2-(3-trimethoxysilylpropylamino)ethylamino]-3-propionate, (N,N'-dimethyl 3-amino)propyl triethoxysilane, N,N-dimethylaminophenyl triethoxysilane, or trimethoxysilyl propyldiethylene triamine; wherein the thickness of said supporting substrate is from about 50 to about 400 microns; the thickness of said silane layer is from about 0.01 to about 5 microns; and the thickness of said second layer is from about 5 to about 150 microns; and wherein the supporting substrate, the silane layer, and the second layer contain a conductive component of carbon black, a polyaniline, a metal oxide, each present in an amount of from 1 to about 50 weight percent, or mixtures thereof, and wherein said intermediate transfer member accepts a xerographic developed toner image from a photoconductor, and subsequently transfers said image to a substrate.

26. An intermediate transfer belt consisting of and in sequence, of a polyimide supporting substrate, an adhesive silane layer, and contained on the silane layer a second layer of a glycoluril resin and an acrylic polyol resin and wherein said glycoluril resin is represented by

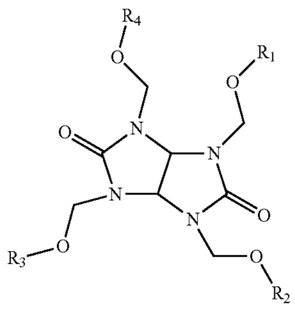

wherein each R group is alkyl with from about 1 to about 6 carbon atoms; and said silane is an aminosilane selected from the group consisting of 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, or N-2-aminoethyl-3-aminopropyl tris (ethylethoxy)silane, and wherein said intermediate transfer member accepts a xerographic developed toner image from a photoconductor, and subsequently permits transfer of said image to a substrate.

27. An intermediate transfer belt in accordance with claim 26 wherein said polyimide supporting substrate includes from 1 to about 4 seams, and wherein the thickness of said polyimide supporting substrate is from about 50 to about 250 microns; the thickness of said silane layer is from about 0.05 to about 1 micron; and the thickness of said second layer is from about 10 to about 100 microns; and further wherein the polyimide supporting substrate, the silane layer, and the second layer contain a conductive component of carbon black, a polyaniline, or a metal oxide, each present in an amount of from 1 to about 25 weight percent; and said acrylic polyol resin possesses a number average molecular weight of from about 400 to about 50,000, and a weight average molecular weight of from about 500 to about 100,000.

28. An intermediate transfer belt in accordance with claim 27 wherein prior to including the second layer the seams present have a roughened surface, and subsequent to including said second layer the seamed areas are smooth.

* * * * *